UNITED STATES PATENT OFFICE.

CHRISTOPHER H. KUHN, OF CINCINNATI, OHIO.

COMPOSITION FOR FILLING THE PORES OF WOOD.

SPECIFICATION forming part of Letters Patent No. 246,889, dated September 13, 1881.

Application filed June 21, 1880. (Specimens.)

*To all whom it may concern:*

Be it known that I, CHRISTOPHER H. KUHN, of Cincinnati, in the county of Hamilton and State of Ohio, have invented a new and useful Improvement in Wood-Fillers, which improvement is fully set forth in the following specification.

This invention relates to an improvement in wood-fillers and in the process of manufacturing the same.

The difficulty with wood-fillers heretofore has been that the ingredient forming the filler either scales or is of such a nature as to be affected by moisture or changes of the temperature; and my object in this invention is to provide an article which will be perfectly free from these objections.

In manufacturing my filler I use the refuse of soap-boilers' waste or the ashes and lime from which the potash has been wholly extracted, (which I regard as substantially the same,) and prepare it as follows: The leached ashes or refuse is taken and washed out thoroughly to rid it of all traces of lye. This is then dried and rewashed as many times as desired. The more it is washed the purer the article will be. When washed as much as desired it is ground. This forms the pure raw filler uncolored. The filler is rarely ever used uncolored, except for the white woods. It is usually necessary, therefore, to color it. For this purpose dyeing substance—such as logwood—is used. To modify or give the desired tints mineral salts—such as tincture of iron or sulphate of iron—are used. It would be impossible to give the proportions of these, because, manifestly, such proportions must be used as will suit the taste. I give, however, the proportions for a brown-colored filler: Use logwood and iron, seven ounces to fourteen pounds of dry filler.

The above is for the dry filler, and the coloring-matter is preferably kept separate from the filler until used. Preparatory to putting on, it is mixed with boiled linseed-oil in proportion of two gallons filler to one of oil, and then colored and applied. It may be put up as a moist preparation, in which case the leached ashes or refuse is washed, dried, and ground the same as for the dry filler above described. This is then mixed with boiled linseed-oil. This is now colored any desired tint the same as the dry filler.

The dyes are such as are used for cotton, wool, and silk, &c., and no special feature is claimed for the dyes, except their use with leached or refuse ashes for a wood-filler.

Having thus described my invention, what I consider new, and desire to secure by Letters Patent, is—

A filler consisting of refuse of soap-boilers' waste washed, dried, and ground, and mixed with boiled linseed-oil in the proportion of two gallons of dry filler to one gallon of oil, and colored, substantially as described.

In testimony that I claim the foregoing I have hereunto set my hand, this 19th day of June, A. D. 1880.

CHRISTOPHER H. KUHN.

Witnesses:
J. S. ZERBE,
W. F. BOSS.